(12) United States Patent
Seesing (10) Patent No.: US 8,408,978 B2
(45) Date of Patent: Apr. 2, 2013

(54) DEVICE FOR PROCESSING POULTRY WINGS

(75) Inventor: William Seesing, Kapellen (BE)

(73) Assignee: FMP International, Kalmthout (BE)

( * ) Notice: Subject to any disclaimer, the term of this patent is extended or adjusted under 35 U.S.C. 154(b) by 329 days.

(21) Appl. No.: 12/334,677

(22) Filed: Dec. 15, 2008

(65) Prior Publication Data

US 2009/0156111 A1 Jun. 18, 2009

Related U.S. Application Data

(62) Division of application No. 11/013,386, filed on Dec. 17, 2004, now Pat. No. 7,479,059.

(30) Foreign Application Priority Data

Dec. 19, 2003 (EP) ..................................... 03447299

(51) Int. Cl.
*A22C 17/00* (2006.01)
*A22C 21/00* (2006.01)
(52) U.S. Cl. ....................................... 452/138; 452/135
(58) Field of Classification Search .......... 452/135–136, 452/138–140, 149–150
See application file for complete search history.

(56) References Cited

U.S. PATENT DOCUMENTS

| 3,348,261 | A |   | 10/1967 | Segur |   |
| 3,412,425 | A |   | 11/1968 | Sturm |   |
| 3,510,908 | A | * | 5/1970  | Lindgren et al. | 452/136 |
| 3,629,903 | A |   | 12/1971 | Turner |   |
| 4,041,572 | A |   | 8/1977  | Martin et al. |   |
| 4,327,463 | A |   | 5/1982  | Martin |   |
| 5,064,403 | A |   | 11/1991 | Elsten |   |
| 5,067,927 | A |   | 11/1991 | Hazenbroek et al. |   |
| 5,176,562 | A |   | 1/1993  | Martin et al. |   |
| 5,203,736 | A |   | 4/1993  | Schulte et al. |   |
| 5,267,891 | A | * | 12/1993 | Cresson et al. | 452/136 |
| 5,494,479 | A |   | 2/1996  | Lindert et al. |   |
| 5,976,004 | A |   | 11/1999 | Hazenbroek |   |
| 6,027,404 | A |   | 2/2000  | Wols |   |
| 6,383,067 | B1 |  | 5/2002  | Kessel |   |

FOREIGN PATENT DOCUMENTS

| DE | 3741121 | 6/1989 |
| EP | 0502581 | 9/1992 |
| FR | 2566629 | 1/1986 |
| JP | 3112436 | 5/1991 |

* cited by examiner

*Primary Examiner* — David Parsley
(74) *Attorney, Agent, or Firm* — Jerold I. Schneider; Schneider Rothman IP Law Group (57) ABSTRACT

A process for trussing up meat attached to at least one bone of a poultry part around an end of the poultry part, which includes the steps of loading each of a series of poultry parts into a trussing up unit at a loading position and positioning the bones of the poultry part into a bone positioning device, displacing each trussing up unit from a loading position towards and along a trussing up pathway and fixing the bones into the bone positioning device, displacing at least one bone partly through the meat through at least one bone positioning device by a pusher, retracting at least one of the bones from the meat and removing the trussed up poultry part.

4 Claims, 5 Drawing Sheets

DEVICE FOR PROCESSING POULTRY WINGS

CROSS-REFERENCE TO RELATED APPLICATION

This application is a divisional application of U.S. application Ser. No. 11/013,386, filed Dec. 17, 2004, which claims priority from European Application 03 447299.3 filed Dec. 19, 2003, the entirety of which is hereby incorporated by reference.

BACKGROUND

The present invention relates to a device for processing poultry wings as described in the preamble of the first claim.

In recent years, an increasing consumption has been observed of so-called lollipops, comprising poultry meat trussed up around an end part of a bone, the meat remaining at least partly attached to the bone. The bone functions as a handle when eating the product. These so-called lollipops are most often by processing chicken wings or pinions. To increase production of such lollipops, devices have been developed with which the processing of chicken wings and pinions may be carried out in an automatic manner.

In US-A-5.267.891 a device for processing pinion parts of chicken wings is disclosed, which comprises a rotatable, horizontal table carrying a plurality of holders, each holder being designed for containing a single pinion in a substantially vertical direction. As the table is rotated, one holder after the other comes into alignment with a vertically aligned pusher device, having a head with a frustoconical shape, which is dimensioned so as to receive the head of the bone in it. As the pusher device carries out a downward stroke, the head of the pusher device is pressed against the upper apex of the pinion, following which the pusher device and pinion are displaced through a clamping device which causes the flesh to be trussed up around the head of the pusher device. The conical shape of the central space of the clamping device in which the pinion and pusher device are received in the course of the trussing up operation, assist in shaping the pinion. As the pusher device proceeds in downward direction, the opening of the clamping device is increased in a stepwise manner, until the pusher device passes through a central hole in a flexible membrane positioned below the clamping device. This central hole is dimensioned somewhat smaller than the pinion, and in that way assists in shaping the flesh and in pushing out of the meat ball during the retracting stroke of the pusher device.

Before being processed with the device of US-A30 5.267.891, the wing or pinion are cut open in cross direction of the bone, at a position above the cotyle. It is alleged that following this cutting there is a tendency of the flesh and skin tend to retract towards the apex of the bone to which they remain attached. However, the radius, i.e. the smaller bone within the pinion, needs to be removed by pulling it out before the pinion can be processed in the device of US-A-5.267.891. This is time consuming and involves the risk that part of the bone of the radius remains behind in the meat.

From US-A-5.976.004 a device for producing a partly deboned poultry product is known, according to which the bone of the poultry part is urged from its bottom end and over at least along part of its length through a hole of a stripping disc. Thereto use is made of a stripping module comprising a downwardly displaceable pusher device which contacts a first end of the bone. In view of facilitating the stripping action, the second opposite end of the bone is clamped by a clamping device and turned at its second end with respect to the stripping disc as the stripping tool is moved over the bone and the meat is progressively stripped from the first bone end. Before the stripping tool reaches the second end of the bone, the stripping process is terminated, leaving the meat clinging to the second end of the bone. A second pusher engages the first end of the bone and pushes the stripped bone portion back through the stripping disc. The displacement of the stripping tool is controlled by a block which is slidable over a pair of upright parallel guide bars. The sliding movement of the block is in turn controlled by a cam wheel rotatably mounted to it, the displacement of the cam wheel in turn being controlled by a cam track. According to US-A-5.976.004, a plurality of such meat stripping modules may be arranged in series on a continuous conveyor system. However, as the bone has to be displaced through the stripper twice, the processing speed of the device disclosed in US-A-5.976.004 is limited as it is only capable of processing one single poultry wing at the time.

There is a need to a device with which the trussing up of meat around an end portion of a bone can be carried out in a virtually fully automated and economically feasible manner.

SUMMARY

It is therefore the object of the present invention to provide a method and a device with which partially deboned meat products may be produced having the meat trussed up around an end part of the bone, in a highly automated manner This is achieved according to the present invention with the technical features disclosed in the characterizing part of the first claim.

The device of this invention comprises a multiplicity of consecutive trussing up units which are displaceable from a loading position, along a trussing up position and preferably further towards a bone and a meat product removal position, so as to allow for a consecutive and continuous processing of a plurality of poultry parts.

Each trussing up unit comprises a carrier tray for receiving the poultry part to be processed in longitudinal direction thereof, a meat stripping tool mounted to a first end part of the carrier tray and a pusher device for displacing the first and second bone through the meat mounted to a second end part of the carrier tray.

The trussing up unit comprises at the first end part of the carrier tray, positioning means for receiving the first end part of at least one of the bones or of the poultry part. The positioning means are provided so as to assist the displacement of the bones in the meat and to allow for removal of any excess bones present in the meat.

The trussing up unit also comprises at the first end of the carrier tray, a meat stripping tool with a first and a second recess through which respectively at least part of the first and second bone of the poultry part to be processed are displaceable with respect to the meat in view of forming a meat product comprising the meat trussed up around the second end part of one of the first and second bone. In a preferred embodiment the meat stripping tool forms the positioning means.

Each trussing up unit is displaceable between a loading position where each carrier tray is loaded with a poultry part, and along a trussing up pathway where the trussing up of the meat around the second end part of the bone is carried out. Preferably, each trussing up unit is further displaceable to a position where the retracted bone is thrown off and to a position where the trussed up meat product is removed from the device.

The device of this invention comprises at a position downstream the loading position, a cutter for cutting an end part of the poultry part connecting the first and second bone in transverse direction in view of facilitating the removal of the second bone and at the same time leaving the first bone unaffected to facilitate consumption of the trussed up part and reduce meat waste to a minimum. Preferably the part of the poultry part is cut which protrudes from the stripping tool.

Each trussing up unit further comprises a pusher device mounted at the position of, preferably to a second end part of the carrier tray, opposite the first end part containing the stripping tool. The pusher device comprises a pusher, the pusher and carrier tray being displaceable with respect to each other in longitudinal direction of the bone, in view of partly displacing at least the second bone through the corresponding recess in the stripping tool and through the meat after the end part connecting the first and second bone protruding from the stripping device, has been cut. The pusher also serves for carrying out a pushing action to the meat in view of compressing and shaping the meat between the pusher and the stripping tool. To achieve such displaceable positioning, at the trussing up pathway means are provided for imparting a displacement of the carrier tray and pusher with respect to each other.

The device further comprises at least one gripper for snapping one of the first and second bone after it has been displaced through the stripping tool and protrudes therefrom in the direction of the gripper. The gripper is provided to exert a retracting action in view of retracting one of the first and second bone from the meat.

Due to the presence of the above described parts, the device of this invention is capable of trussing up the meat of a poultry part containing one or more bones around an end part of one of the bones, of removing at least one of the other bones and of simultaneously shaping the meat into a product showing good consistency and easy to process.

According to a first preferred embodiment, each trussing up unit comprises at a position opposite the first end part of the carrier tray carrying the meat stripping tool, a gripper which is positioned so as to clamp the second bone when protruding from the stripping tool, the gripper being provided to exert a reciprocating motion between a position proximal to the stripping tool for clamping the second bone and a position distal from the stripping tool at a position corresponding to or downstream the trussing up pathway, for retracting the second bone from the meat. This permits optimum positioning of the gripper with respect to the first or second bone and optimum removal of that bone.

It is however also possible to fix the position of the gripper and to have the carrier tray with pusher device and preferably also the stripping tool displaceable with respect to the gripper.

According to another preferred embodiment, the device of this invention comprises along the trussing up pathway, a guiding for guiding the displacement of the pusher in the direction of the stripping tool. By moving the pusher with respect to the stripping tool, the concept of the device may be simplified.

To allow for an automatic return of the pusher, it is preferred that the pusher is displaceable against a backward force, for example of a spring, forcing the pusher device away from the stripping device.

To allow for a proper and simple positioning of the poultry parts to be processed, the stripping tool comprises at the position of the first end of the carrier tray, a bottom part with at least two recesses with an open top for receiving the bones of the poultry part which is to be trussed up. The stripping tool further comprises a top part which is provided to co-operate with the bottom part each top part comprising at least two recesses corresponding with the recesses in the bottom part, which are open towards the recesses in the bottom part. Positioning of the poultry parts before the trussing up operation and removal of the poultry parts after the trussing up operation is completed, is facilitated by having the top and bottom part displaceable with respect to each other.

Other preferred embodiments are specified in the appending dependent claims.

The present invention also relates to a method for trussing up meat of a poultry part, in particular a pinion, around an end of the bone contained in the poultry part as described in the appending claims.

BRIEF DESCRIPTION OF THE FIGURES

The invention is further elucidated in the appending figures and description thereof.

DETAILED DESCRIPTION

Figure 1:
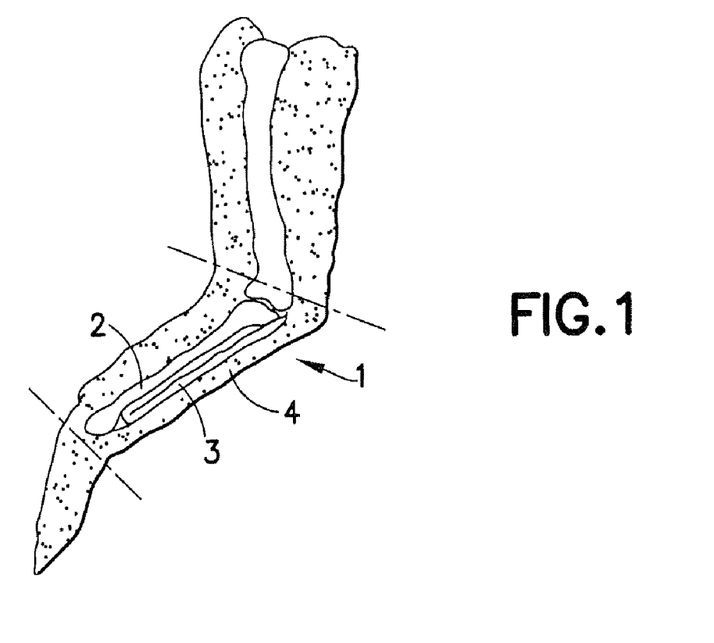
FIG. 1 is a cross section of a poultry wing.
Figure 2:
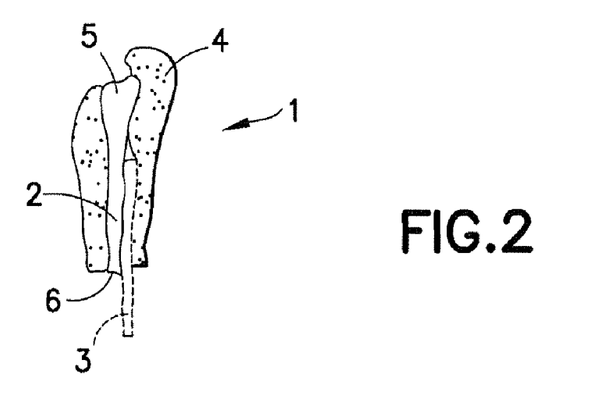
FIG. 2 is a cross section of a pinion to be processed in the device of this invention, the end parts containing the knuckles which connect the bones, not shown.

As can be seen from FIG. 1, the device of this invention is particularly designed for carrying out a trussing up operation of the intermediate part or pinion 1 of the wing of a poultry par, although the device may also be used with other poultry parts. In that case it may be advisable to adapt the size of essential parts of the device of this invention to the size of the poultry parts to be treated. The device of this invention is however also suitable for carrying out a trussing up operation of a meat part containing two or more bones, and for removing one or more of the bones from the meat part.

Figure 3:
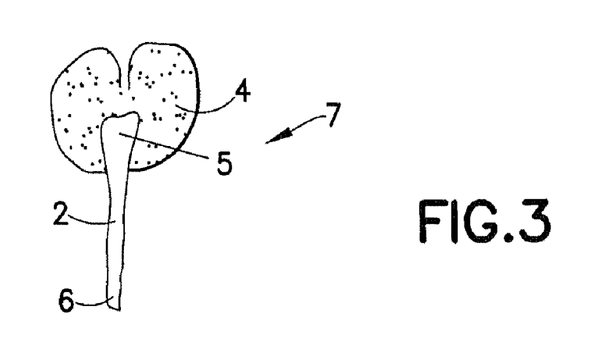
FIG. 3 shows the poultry part after the trussing up operation has been carried out.

The pinion part of a poultry wing comprises a bone 2 and a radius 3. Pinions are usually commercially available in a form in which the radius 3 and bone 2 are attached to their common knuckles, the radius 3 being further attached to the surrounding meat 4 through the tendons. The poultry wing comprises a first end 6 and a second end 5. As can be seen from FIG. 3, after the trussing up operation has been carried out, the radius 3 has been removed from the poultry part and the meat 4 has been trussed up around the second end 5 of the bone 2.

Figure 4:
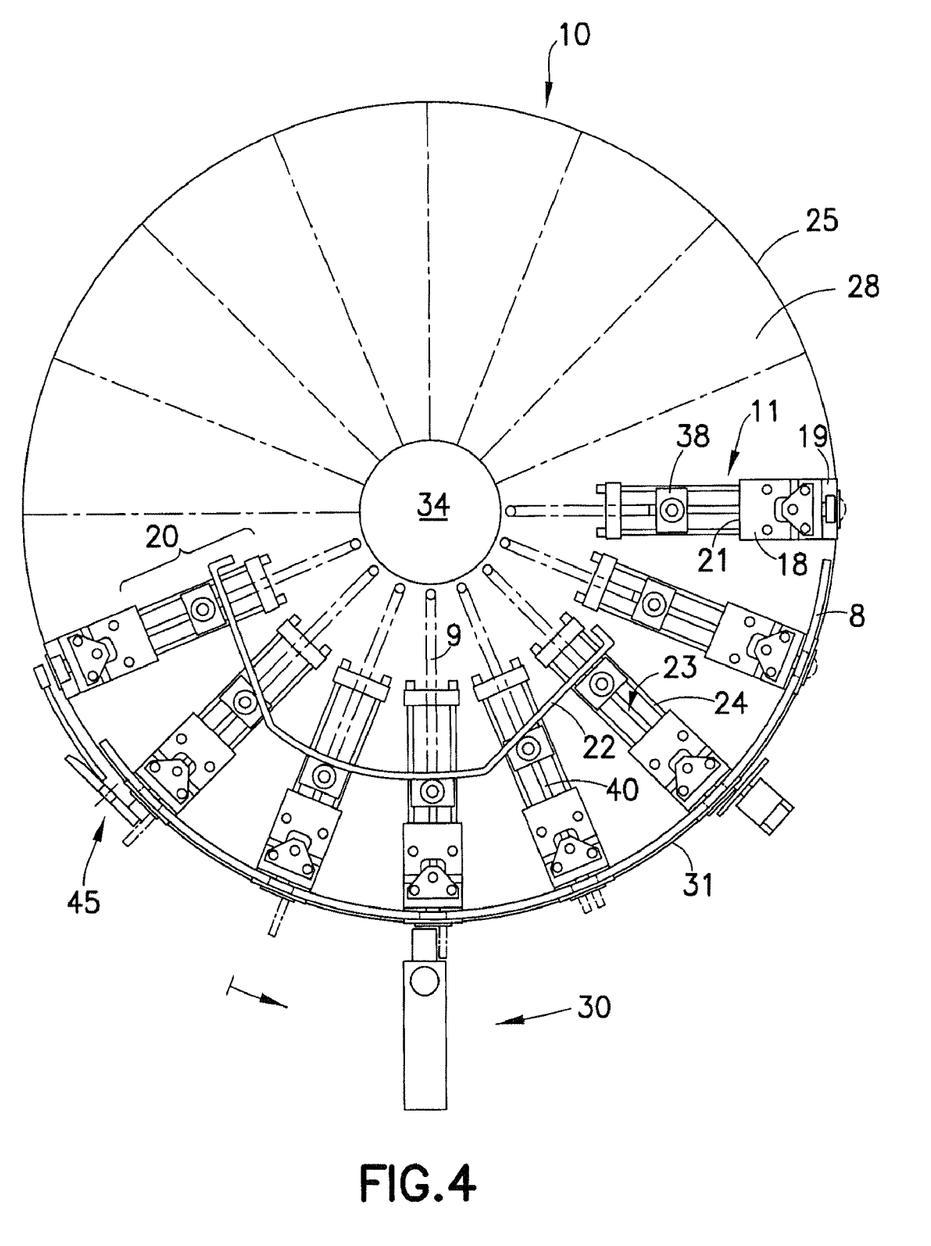
FIG. 4 is a top view of a first embodiment of the device of this invention.
Figure 5A:
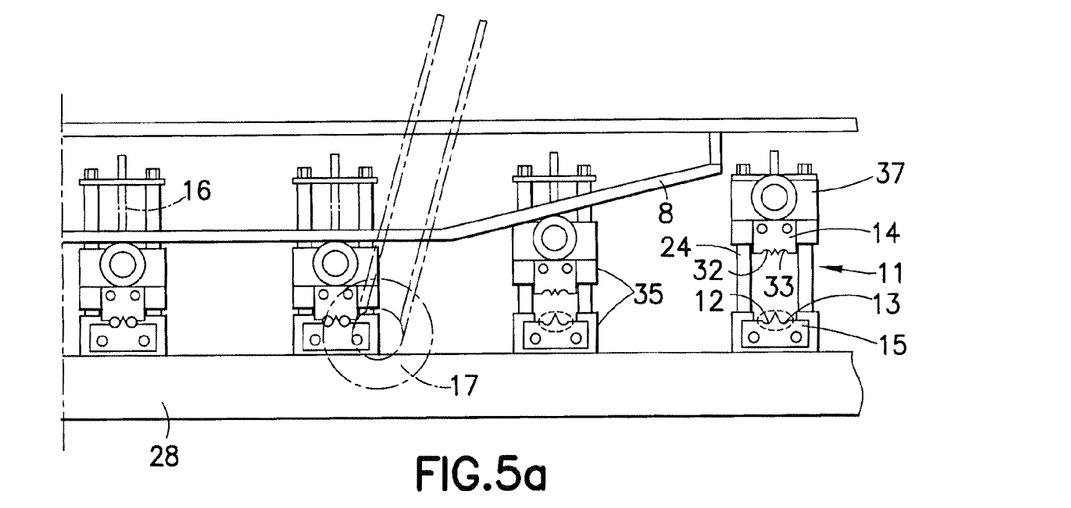
FIGS. 5a and 5b show a front view of first embodiment of the device of this invention.
Figure 5B:
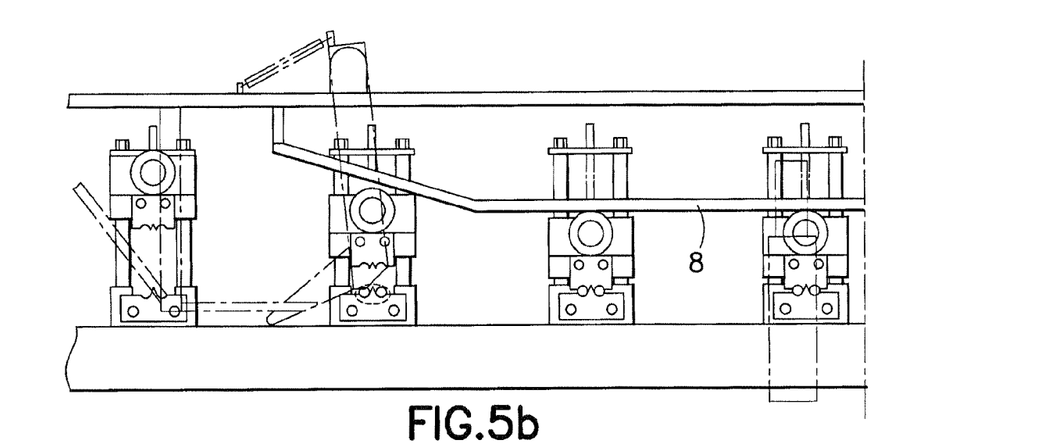

As is shown in the preferred embodiment of FIGS. 4 and 5, the device of the present invention comprises a mounting table or stand 28 to which the trussing up units are mounted. Thereby the rotation axis may extend substantially vertical, substantially horizontal or any other direction ought suitable by the person skilled in the art. Rotation about a substantially horizontal axis allows limiting the space occupied by the device. In the preferred embodiment of FIG. 7, the trussing up units are mounted between two parallel plates which are rotatable around a substantially horizontal axis. In stead of a table or stand, use can also be made of a revolving endless track or conveyor belt or any other similar means known to the man skilled in the art.

As can be seen from FIG. 4, a series of trussing up units 11 are mounted to the surface of the table 28 along the periphery. The table 28 is rotatable around a central axis 34, in view of moving each trussing up unit 11 between a loading position 25 where a poultry part is loaded into a trussing up unit, towards and along a trussing up pathway 30, where the trussing up operation of the poultry part is to be carried out. The device shown in FIGS. 4 and 5 is designed to have a substantially horizontal table 28, the carrier trays 18 containing the poultry parts 1 extending horizontally from the periphery of the table towards the center or perpendicular to the rotation axis. Within the framework of the invention it is however also possible to have the carrier trays 18 extending in a vertical or slanting position, or as is shown in FIG. 7, parallel to the rotation axis.

Each trussing up unit 11 comprises a carrier tray 18 for supporting the pinion part to be trussed up (FIG. 4, 5). A second end part 21 of the carrier tray 18 carries the pusher device 20, for displacing the bones 2, 3 with respect to the meat 4. The pusher device may however also be mounted independently of the carrier tray. This second end part 21 of the carrier tray 18 is preferably positioned at an inward position of the rotating table 28. A first end part 19 of the carrier tray 18 is positioned close to, preferably along the periphery 31 of the mounting table 28, in view of facilitating the cutting of parts which extend from the first end 21 of the carrier tray 18 and of removing the bones from the parts to be trussed up. The carrier tray 18 may be conceived as a fiat block or plate or may contain a recess allowing for an improved positioning of the poultry parts 1. The carrier tray 18 will usually be made of a material which is compatible for use with food products. At a position close to or to the first end part 19 of the carrier tray, the stripping tool 14, 15 is mounted.

Figure 7:
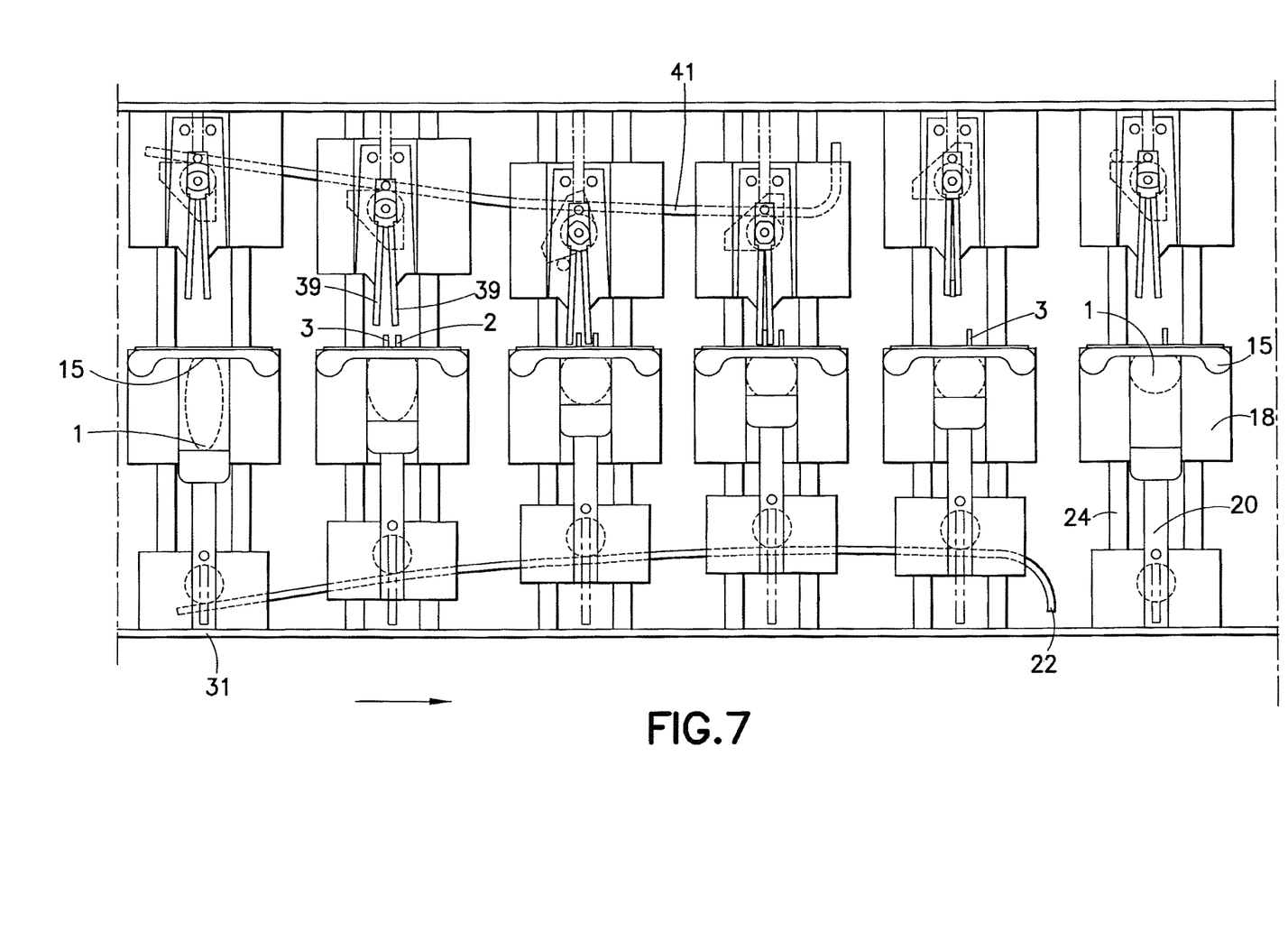
FIG. 7 shows a view to the top of a device of a second embodiment of the invention.

In the embodiment of FIG. 7, each trussing up unit 11 comprises a carrier tray 18 for supporting the pinion part to be trussed up. A second end part 21 of the carrier tray 18 carries the pusher device 20, for displacing the bones 2, 3 with respect to the meat 4. The first end part 19 of the carrier tray 18 comprises a stripping tool 14, 15 having at least one, but preferably two recesses 12, 13 for receiving the bones 2, 3 of the poultry part or pinion 1 which is to be trussed up.

In an easy to mount construction, the stripping tool comprises a top 14 and bottom 15 part which are formed as co-operating parts or plates, having at least two co-operating recesses 12, 13 for receiving the bones 2, 3 therethrough. The top and bottom part may be for example made of plastic material or of metal or any other material ought suitable by the man skilled in the art.

To facilitate positioning of the pinion 1, the stripping tool 14, 15 comprises a bottom part 15 which is mounted to the first or front end 19 of the carrier tray 18, and a top part 14 which is displaceable with respect to the bottom part 15. In the preferred embodiment of FIGS. 4 and 5, the displacement of the top part 14 towards the bottom part 15 is achieved by means of a top guiding 8, mounted independently of the table 28, in the vicinity of its periphery. The top guiding 8 extends from a position between the loading position 25 and along the trussing up pathway 30, to the position where the meat is fully trussed up and the poultry part is to be removed from the carrier tray 21. The top guiding is designed to descend from a first position corresponding to an open position of the stripper tool in which the top and bottom part 14, 15 of the stripper tool are remote from each other, to a second position corresponding to a closed position of the stripper tool in which the top and bottom part 14, 15 of the stripper tool receive and hold between them the bones 2, 3 of the pinion 1 to be trussed up. The top part 14 of the stripping tool is preferably slideable along another guiding, in a direction to and from the bottom part 15 against an upward force, forcing the top part 14 away from the bottom part 15. The upward force may for example be generated by a spring or any other means known to the man skilled in the art. However, if the machine design so requires, the top part 14 may take the fixed position, the bottom part 15 possibly with carrier tray 18 being displaceable with respect to the top part 14.

Figure 6:
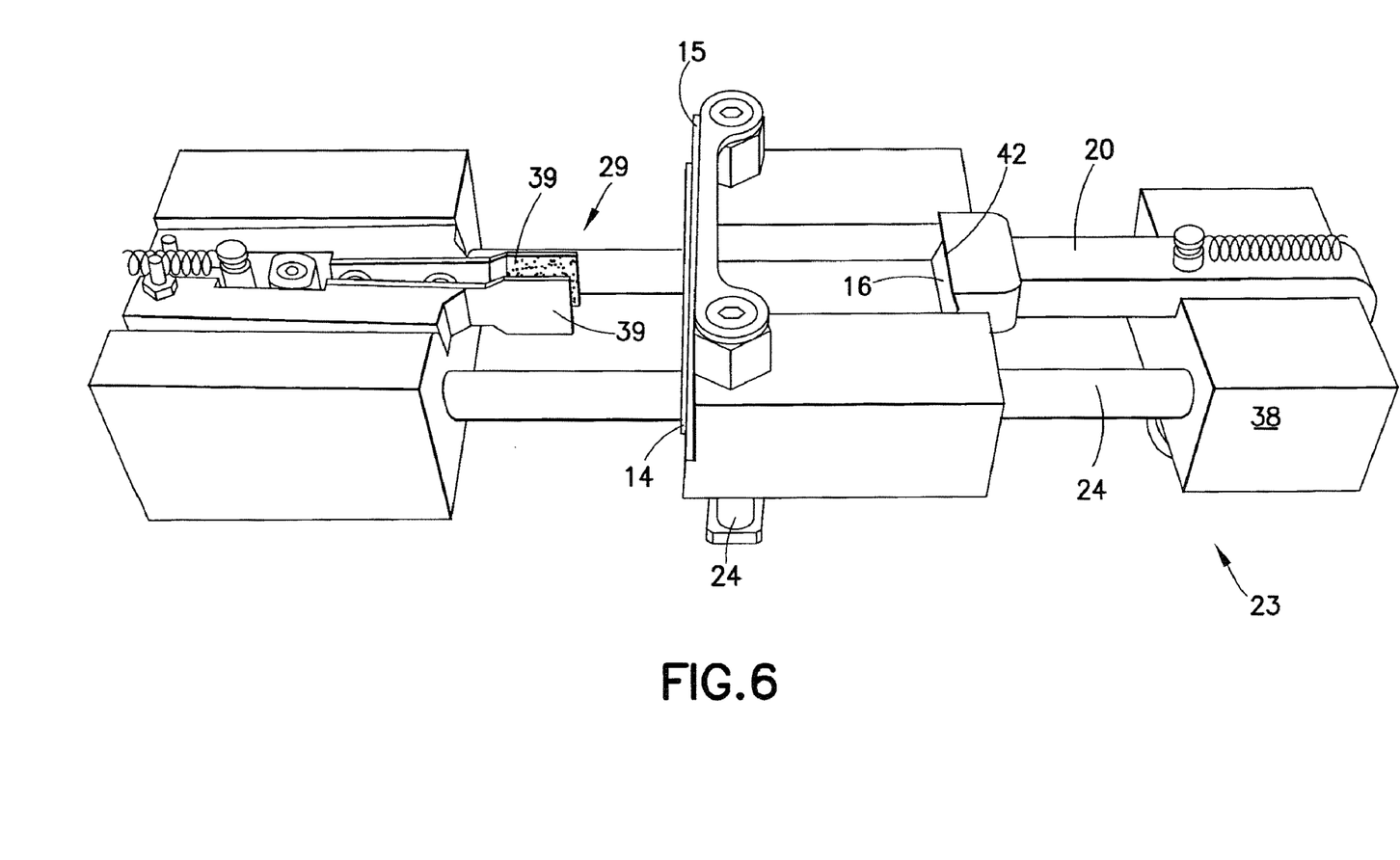
FIG. 6 shows a trussing up unit of a second embodiment of this invention.

In the preferred embodiment of FIGS. 6 and 7, the top part 14 of the stripping tool is mounted so as to be displaceable in upward direction against a downward force, in particular gravity, in a direction pointing away from the bottom part 15. This is done to improve and facilitate fixation of the poultry part. To force the top part 14 in upward direction, the top part 14 is connected to a guiding 24 which is slideably mounted with respect to the carrier tray 28, in height direction thereof. The guiding 24 is provided to co-operate with a further guiding, forcing the top part 14 of the stripping tool upwardly, at a position downstream the trussing up pathway 30 and at or towards the loading position 25.

In both the embodiments shown in FIGS. 4, 5 and 6, 7 the shape and dimensions of the recesses 12, 13 will usually be adapted by the man skilled in the art taking into account the dimension of the bones around which the meat is to be trussed up and the dimensions of the bones to be removed. The dimensions of the recesses 12, 13 will usually be selected such that displacement of the bones 2, 3 therethrough is allowed, however displacement of the knuckle and meat 4 connecting the second end part 5 of the poultry part, through the recesses being prevented.

To facilitate trussing up ad removal of at least one of the bones, the device of this invention preferably comprises means, for example a cutter 17, for example a rotary knife, for removing the knuckle and any tendons protruding from the first end 19 of the carrier tray 20, i.e. from the stripper tool 14, 15 and/or from the edge of the table 28. However, if so desired the man skilled in the art may use any other cutting or removal tools known in the art. This cutter 17 is located at a position downstream the loading position 25, at a position corresponding to the closed position of the stripper tool 14, 15.

Each trussing up unit 11 further comprises a pusher device 23, the pusher device 23 and stripping tool 14, 15 being displaceable with respect to each other, in particular to and from each other. To facilitate construction, the pusher device 23 is displaceable to and from the stripping tool 14, 15. As can be seen from FIGS. 4, 5, 7 the pusher device 23 comprises a pusher 20, which when displacing the bones through the meat is displaced between (a) a loading position where the pusher 23 is retracted towards the second end 21 of the carrier tray 18, to allow for inserting a poultry part into the carrier tray 18, and (b) a trussing up position where the pusher 23 is advanced from this second end part 21 towards the first end part 19 of the carrier tray.

In a preferred embodiment, the pusher 20 is displaced against a backward force, forcing the pusher 20 to take the loading position. This is done to provide for an automatic retraction of the pusher after the trussing up operation has been completed and the poultry part has been removed from the carrier tray 18. The backward force may be generated by any suitable means known to the man skilled in the art. In the preferred embodiment of this invention, the backward force is generated by means of a spring.

As can be seen from FIG. 4, the pusher 20 comprises a block 38 which is moveable along two opposite guidings 24. To a side of block 38 facing the carrier tray 18 a rod 40 is attached carrying a pusher block 38 having a front end with a central recess 16 for receiving the second end part 5 of the bone around which the meat 4 is to be trussed up. The guidings 24 are mounted to the table 28. In the embodiment of FIG. 4, the displacement of the pusher 20 is imparted by a horizontal guiding 22 mounted independently of the rotating table 28, which guiding 22 at the trussing up pathway 30 contacts the block 38 and forces the block to slide along the guidings 39 in the direction of the stripping tool 14, 15.

In the embodiment of FIG. 7, the displacement of the pusher 20 towards the first end 19 of the carrier tray is guided by a guiding 46 forcing the pusher 20 from one peripheral side of the conveyor in the direction of the opposite peripheral side.

The device is suitable for removing either the smaller 3 or larger bone 2 from the poultry part. Preferably however, the poultry part will be positioned in the carrier tray in such a way that the clamping means and gripper 29, 39 are positioned to grip the smaller bone 3, as this is the easier bone to remove from the poultry part. To allow removing the bone 2, 3, the gripper 29 is movable towards and from the stripping tool 14, 15 so as to allow that the bone 2, 3 protruding from the stripping tool is clamped by the gripper and retracted from the meat by imparting a retracting movement to the gripper. This retracting of the bone is preferably carried out after the meat has been trussed up around the second end 5 25 of one of the bones 2, 3. To exert the retracting action, the device of this invention may comprise one single gripper 29, which is advanced towards a trussing up unit each time a bone to be retracted passes the gripper (see FIG. 4, 5).

However, the inventors have found that optimized removal of bones may be achieved when each trussing up unit contains a gripper associated with it as is shown in the preferred embodiment of FIGS. 6 and 7. This embodiment provides a facilitated positioning of the gripper 29 with respect to the (second) bone 3 to be withdrawn. As can be seen from FIG. 6, each gripper 29 comprises a pair of clamps 39 which are movable towards and from each other. The clamps 39 are displaceable towards and away from the stripping tool 14, 15 against a backward force, forcing the clamps away from the stripping tool. The backward force may be exerted by any suitable means known to the person skilled in the art, but are for example exerted by means of a spring. To advance the gripper 29 towards the stripping tool 14, 15, the device comprises a guiding 41 forcing the clamps 39 towards the stripping tool 14, 15. This guiding extends from a position downstream the loading position 25 along the trussing up pathway 30 to the position where the bone 2, 3 is retracted from the meat.

The gripper 29 may for example comprise two opposite mounted claws having a roughened surface in view of improving the grip. In the embodiment shown in FIGS. 6 and 7, the claws 39 are moveable towards and from each other by means of an excenter which is rotatable upon activation by a cooperating guiding and notch. However any other means suitable to that end, known by the person skilled in the art may be used.

In the embodiment of FIGS. 4 and 5, removal of the trussed up poultry parts at the removal position is facilitated by the presence of a resistance provided to lift the poultry part from the carrier tray 18, and means for subsequently canting the poultry part. The device of this invention may further comprise a first collector at the position of the gripper 29 for collecting the removed bones, and a second collector at the removal position for collecting the trussed up poultry parts.

It is however also possible to fix the position of the clamping device or gripper 29, 39 and to have the trussing up unit displaceable with respect to the gripper.

In the preferred embodiment of FIGS. 6 and 7, the trussed up poultry parts automatically drop from the carrier tray when the carrier tray is rotated to an upward-down position along with the table.

The operation of the device of the invention shown in FIGS. 6 and 7 can be described as follows.

At the loading position 25, each carrier tray 18 is provided with a poultry part 1 to be trussed up. The upper part 14 of the stripping tool is in the upward position remote from the bottom part. The poultry parts 1 are inserted in such a way that one of the knuckles protrudes from bottom part 15 of the stripping unit, and each of the two bones of the poultry part is received in the corresponding recesses 12, 13 of the bottom part 15 of the stripping unit. As the mounting table 28 rotates, the carrier tray 18 is moved from the loading position 25 towards and along the trussing up pathway 30. In the course of such rotation, first the front end of the pusher 42 is moved to contact the poultry part and to fix its position within the carrier tray. Displacement of the pusher 20 is obtained as soon as the pusher block 38 contacts the guiding 22. From that position on, the pusher is 20 is forced to slide towards the stripping unit 14, 15 the front head 42 of the pusher 23 contacting the first end 5 of the poultry part 1. Then, the upper part 14 of the stripping unit is moved towards the bottom part 15, in view of fixing the position of the bones 2, 3 within the co-operating recesses 12, 13, 32, 33. As the table 28 is rotated further, the top part 14 has taken its lowermost position, and the knuckle or front part of the poultry part is cut away by the cutter 17.

Then, the gripper 29 is displaced towards the stripping tool 14, 15, to take a position before one of the recesses 12, 13, the clamps 39 being spaced from each other. The pusher is advanced towards the stripping tool 14, 15 by means of a guiding 22, to force the bones to move through the meat and to compress the meat between the pusher 20 and the stripping tool 14, 15. As soon as the pusher 23 has taken a pre-defined distance, the clamps 39 are actuated towards each other to clamp the second bone 3, and then to retract from the stripping tool 14, 15. Thereafter, the clamps are released and the second bone 3 is dropped in a first collector. As the device is further rotated, the pusher 20 is displaced in a direction pointing away from the stripping tool 14, 15, top part 14 of the stripping unit is raised by a raising or lacking guiding 8, and the meat product is dropped from the carrier tray to be collected in the second collector. While the bones 2, 3 are displaced through recesses 12, 13, 32, 33, the meat 4 is shaped between front head 42 of the pusher and the stripping device.

The invention claimed is:

1. A process for trussing up meat attached to at least two elongated bones of a poultry part around an end of the poultry part, characterized in that the process comprises the steps of loading each of a series of poultry parts into a trussing up unit at a loading position and positioning the at least two bones of the poultry part into bone positioning means, displacing each trussing up unit from the loading position towards and along a trussing up pathway and fixing the at least two bones into the bone positioning means, displacing the at least two bones partly through the meat through at least one of the bone positioning means by means of a pusher such that the meat of the poultry part is trussed up around an end part of one of the bones, retracting at least only one of the other bones from the meat while the bone on which the meat is trussed up remains in the trussed up part, and removing the trussed up poultry part.

2. A process according to claim 1, characterized in that an end part of the poultry part connecting the first and second bone in transverse direction is cut by a cutter after the at least two bones have been positioned into the bone positioning means.

3. A process according to claim 2, characterized in that at least part of the first and second bone of the poultry part are displaced through the meat through respectively a first and a second recess of the bone positioning means after the end part has been cut and wherein the meat is compressed in longitudinal direction between at least part of the bone positioning means and the pusher.

4. A process according to claim 2, characterized in that the poultry part includes only two bones.

* * * * *

UNITED STATES PATENT AND TRADEMARK OFFICE
CERTIFICATE OF CORRECTION

PATENT NO. : 8,408,978 B2
APPLICATION NO. : 12/334677
DATED : April 2, 2013
INVENTOR(S) : William Seesing Page 1 of 1

It is certified that error appears in the above-identified patent and that said Letters Patent is hereby corrected as shown below:

Title Page, Item (73) Assignee should read:

Assignee: [FMP] FPM International, Kalmthout (BE)

Signed and Sealed this
Fourteenth Day of May, 2013

Teresa Stanek Rea
*Acting Director of the United States Patent and Trademark Office*